United States Patent [19]

Solari

[11] Patent Number: 4,993,349
[45] Date of Patent: Feb. 19, 1991

[54] PROPULSION FOR BOATS CONSISTING OF JETS OF AIR DRAWN INTO A PAIR OF LONGITUDINAL CHANNELS UNDER THE HULL

[76] Inventor: Franco Solari, Marcantonio Colonna, 59, 20149 Milan, Italy

[21] Appl. No.: 331,663

[22] PCT Filed: Sep. 24, 1986

[86] PCT No.: PCT/IT86/00072
§ 371 Date: Jan. 23, 1989
§ 102(e) Date: Jan. 23, 1989

[87] PCT Pub. No.: WO88/00903
PCT Pub. Date: Feb. 11, 1988

[30] Foreign Application Priority Data

Jul. 31, 1986 [IT] Italy .................. 21336 A/86

[51] Int. Cl.⁵ .............................................. B63B 1/32
[52] U.S. Cl. ...................................... 114/289; 440/44; 440/69

[58] Field of Search ............... 114/67 A, 288, 289, 114/290; 440/37, 38, 40–44

[56] References Cited

U.S. PATENT DOCUMENTS

| | | | |
|---|---|---|---|
| 1,408,178 | 2/1922 | Downing | 114/67 A |
| 1,656,411 | 1/1928 | Baldwin | 114/67 A |
| 1,795,596 | 3/1931 | Fleming et al. | 114/289 |
| 1,837,508 | 12/1931 | Volf, Jr. | 114/289 |
| 1,960,826 | 5/1934 | Ouellett | 440/44 |
| 2,993,462 | 7/1961 | Gough | 440/44 |

Primary Examiner—Joseph F. Peters, Jr.
Assistant Examiner—Jesûs D. Sotelo
Attorney, Agent, or Firm—Michael J. Striker

[57] ABSTRACT

Propulsion for boats (10) by jets of compressed air inside a pair of parallel longitudinal channels (11) open underneath, placed below the hull, substantially horizontal, one on each side of a third wider axial channel (13) suitable for formation, as a consequence of the movement of said boat, of a cushion of air that sustains the hull when sliding over the water.

10 Claims, 4 Drawing Sheets

PROPULSION FOR BOATS CONSISTING OF JETS OF AIR DRAWN INTO A PAIR OF LONGITUDINAL CHANNELS UNDER THE HULL

BACKGROUND OF THE INVENTION

It is well known that boats can be propelled heteronomously (such as by a sail) autonomously (where the source of energy is generated within the boat) such as by water jet propulsion or by a marine screw propeller.

Water jet propulsion is advantageous at speeds greater than 70 knots and creates problems in the structure and system as a high rate of flow is needed for satisfactory performance.

Marine screw propulsion (from 2 to 6 blades) creates problems as, if a certain number of revolutions is exceeded, cavitation occurs with reduced thrust.

To drive the propeller alternating marine internal combustion engines cooled by sea water are generally used, but their efficiency is considerably less than that of land-based engines.

The above invention eliminates or appreciably lessens these drawbacks by means of a system which creates a high thrust and at the same time allows the boat to ride on a cushion of air as will be explained below.

SUMMARY OF THE INVENTION

Subject of the invention is a system of propulsion for boats obtained by thrust from jets of air inside a pair of equal rectilinear parallel channels, open on the downward side, symmetrical in relation to the longitudinal axis, mounted under the hull, substantially flat, placed one on each side of a third and broader rectilinear axial channel. While in movement, the hull is therefore practically resting on the air entering the pair of channels and on that generated in the middle channel due to boat movement itself. All this causes the boat to be raised above the surface of the water thus reducing sliding friction.

The air is sucked in near the bow end by an internally mounted engine-driven propeller and is carried in two tubular ducts inside the hull, flowing out through apertures at the summit of the pair of channels near the stern. The propeller is driven by an internal combustion engine of the type used on land.

The mouths for air outflow are fitted with on-off valves and with directional conveyors to stop the jets in one channel or the other and change their direction thus driving the boat forward or slowing it down as desired.

On each of its sides, respectively towards bow and stern, there are at least two nozzles fitted with on-off valves connected to the tubular parallel ducts carrying compressed air so that by opening one or other of the nozzles, the boat can be turned round in either direction as desired and can make any other limited movements that may be required within a small space.

The on-off valves and directional conveyors are served by hydraulic cylinders operated by a set of controls, placed on a dashboard and the like, from a unit driven by the propeller engine.

The cross section of the central channel is substantially in the shape of a wide arc joined at the ends by narrower arcs.

The section of the channels placed side by side is throughout substantially semi-circular.

The hull has substantially vertical sides and a base which is practically formed of the three said channels and of the lower extremities of the sides which project laterally, in convex form, in relation to the external vertical sides of the lateral channels and at a level above their base. These projecting sides therefore help to keep the boat steady when lying still or moving slowly while, when at a certain speed, they are practically off the water thereby reducing friction.

The nozzles are placed in the small longitudinal groove formed between the external vertical sides of the pair of channels and the lateral convex sections of the bottom of the hull.

The directional conveyors of the tubular ducts carrying compressed air are formed of a sort of vertical arched groove, with the concave side towards air jet inflow, articulated crosswise to its axis and to the channel in which each conveyor is mounted.

Said articulation makes possible its partial or complete projection in the space occupied by the channel, compelling the jet of compressed air flowing to the stern to turn downwards and towards the bow, to slow down the boat or put it into reverse as required.

The controls are arranged together in a set of six levers of which two intermediate lateral levers are for "normal forward" movement, a pair of front ones respectively for "forward to the left" and "forward to the right", a pair at the back for "minimum left" and "minimum right". When moved together the front pair of levers give forward movement or stop the boat while if the back pair are moved together they stop the boat or reverse it.

The characteristics and purposes of the invention will be still clearer from the following detailed description of the preferred embodiment when read with reference to the accompanying drawings.

DETAILED DESCRIPTION OF THE PREFERRED EMBODIMENT

Figure 1:
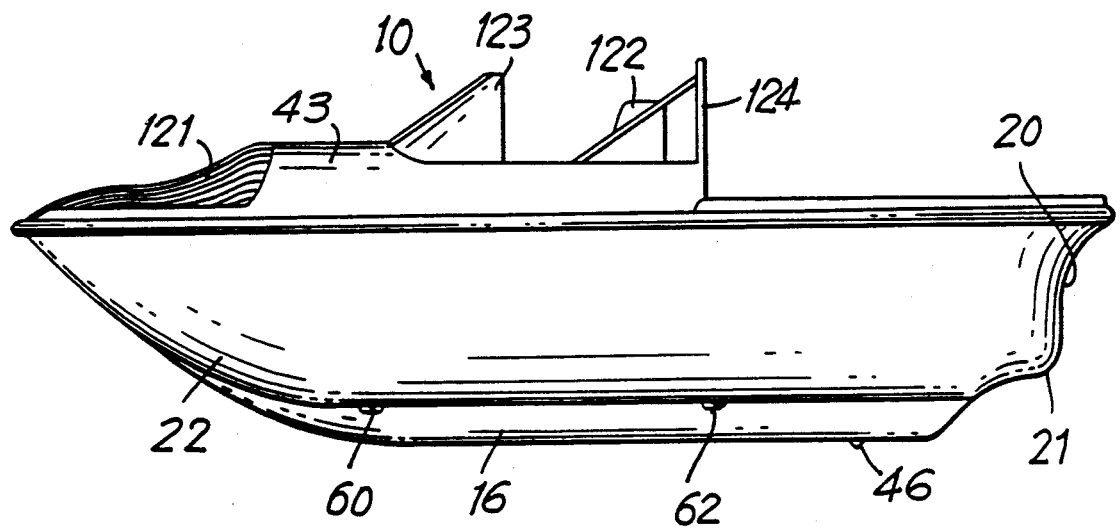
FIG. 1 shows a side elevational view of a boat with a propulsion system according to the invention.
Figure 2:
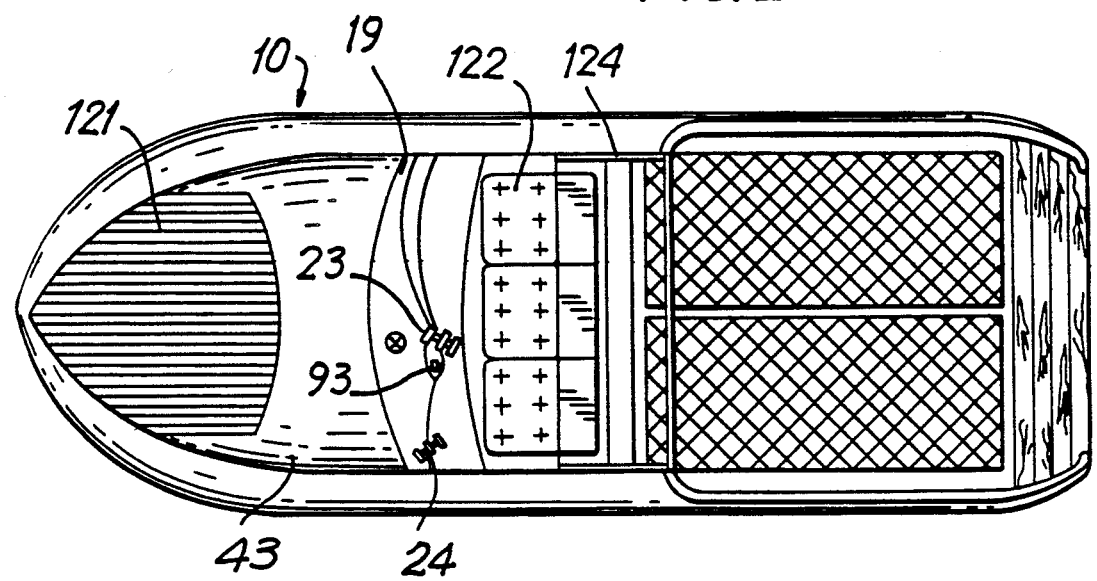
FIG. 2 shows a top view of the boat shown in FIG. 1.
Figure 3:
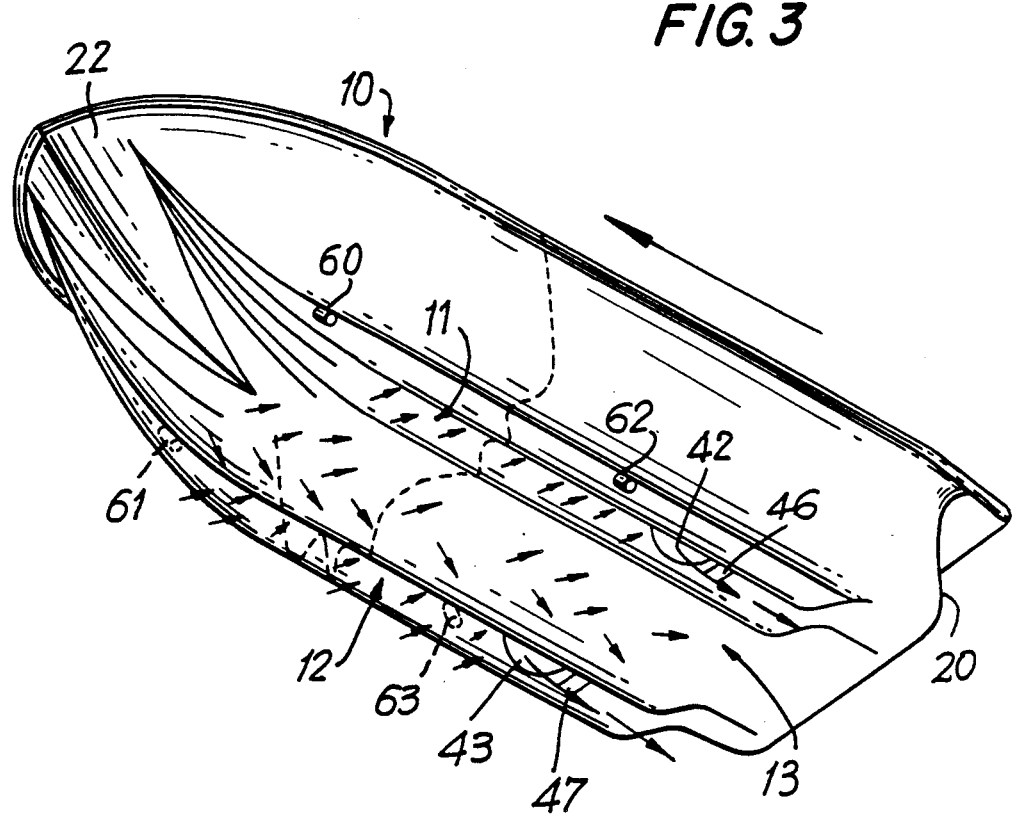
FIG. 3 bottom view of the boat shown in FIG. 1.
Figure 4:
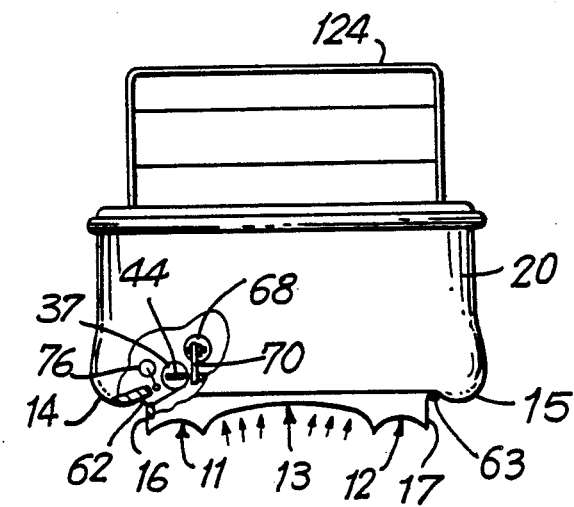
FIG. 4 shows a back view of the boat shown in FIG. 1.
Figure 5:
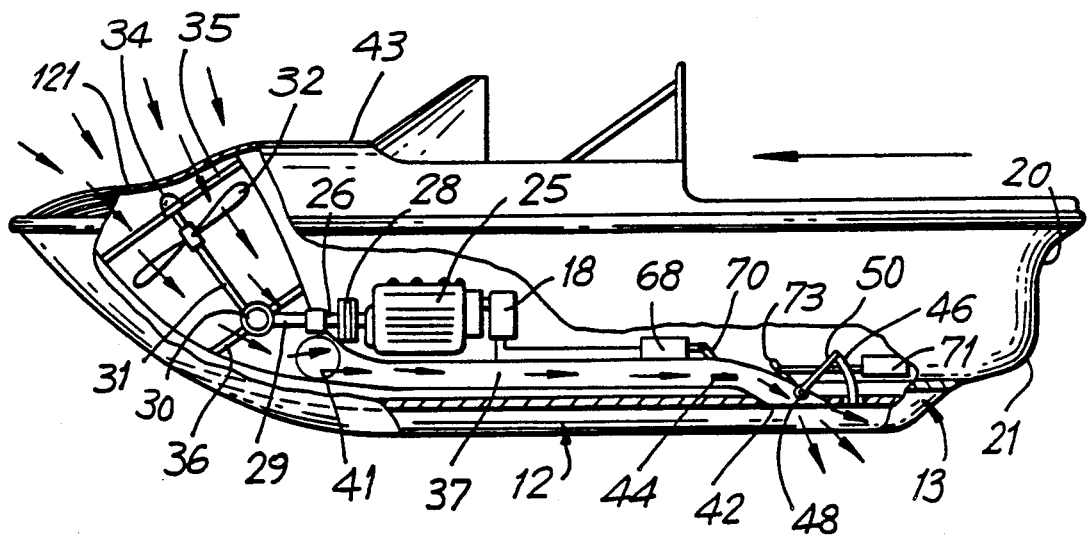
FIG. 5 shows a partially cross-sectional side view of the boat shown in FIG. 1.
Figure 6:
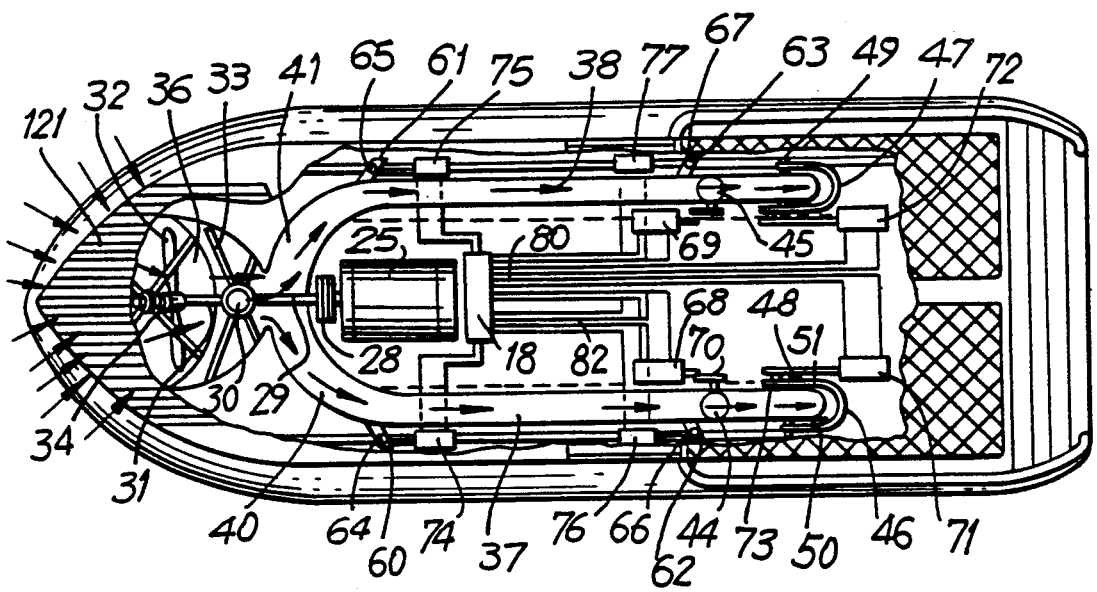
FIG. 6 shows a top view of the boat shown in FIG. 1 with some of the upper part of the hull cut away.

The boat (10) is formed of a hull having a substantially horizontal base and vertical sides.

Underneath the hull there are two parallel channels, symmetrical in relation to the longitudinal axis, having sections in the form of an arch of a circle (11), (12), one on each side of a wider central channel (13).

At its sides the hull has slightly projecting convex longitudinal zones (14), (15).

The external sides (16), (17) of the lateral channels are substantially vertical and connect with the convex zones by means of a longitudinal groove.

The stern (20) is substantially vertical.

The bow (22) is steeply inclined, merging gently into the variously shaped base already described, so as to present a substantially smooth and continuous surface.

Propulsion is given by a land-type internal combustion engine (25) which, with a shaft (26), a clutch (28), a rotating joint (30) and an intermediate shaft (31), inclined at nearly 45°, drives a six-bladed propeller (32) mounted close to the front of the hull at its uppermost point.

The joint box is supported by a cross journal (33) while the end of the intermediate shaft (31) can rotate in the bushing (34) supported by the cross journal (35).

The cross journals (33), (35) are fixed to the sides of the cone-shaped chamber (36) which divides into two parallel horizontal tubular ducts (37), (38) through the widely curving connecting sections (40), (41).

Near the stern (20) these ducts lead into the mouths (42), (43) which open into the summit of the lateral channels. Close to said mouths the valves (44), (45) are mounted on the ducts.

In front of said mouths, transversally to the parallel channels (11), (12), the directional deflectors (46), (47) are mounted, each one formed of a short arched channel which can be extracted from the hull and, by means of arms (50), (51), rotating round the horizontally lying articulations (48), (49) transversal to the channels.

On the external vertical sides (16), (17) of the channels, at the point of the groove formed with the lateral convex zones at the base of the hull, there are four nozzles (60), (61), (62), (63) connected to the ducts (37), (38) and fitted with regulating on-off valves (64), (65), (66), (67).

The on-off valves (44), (45) connected to said ducts are operated by the hydraulic cylinders (68), (69) by means of levers (70).

The directional deflectors (46), (47) are worked by the hydraulic cylinders (71), (72) by means of small levers (73) fixed to the articulation pins (48), (49) of said deflectors.

The nozzle valves are operated by hydraulic cylinders (74), (75), (76), (77).

All the hydraulic cylinders for the valves and for the directional conveyors are connected to the hydraulic drive unit (18) by means of sets of tubes (80) and (82) to and from said unit.

The main controls are placed on the boat's dashboard (19) and in particular the unit (23) for operating the tubular duct valves and for operating the directional deflectors, the unit (24) for operating the valves in the lateral nozzles, and the accelerator (93) of the engine.

Figure 9:
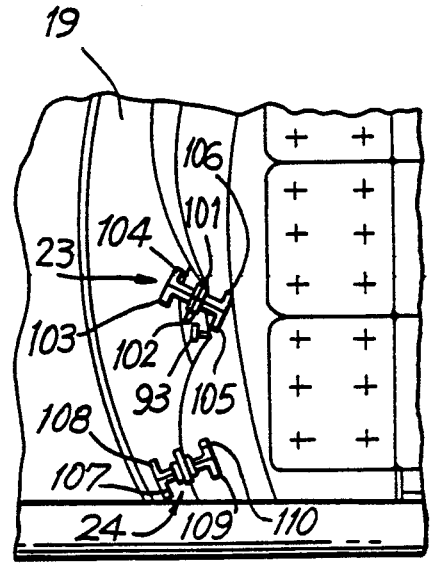
FIG. 9 shows a portion of the dashboard.

Unit (23) comprises (see FIG. 9) the central levers (101), (102) for driving the boat straight forward, the front levers (103), (105) respectively for "forward left" and "forward right", and the back levers (104), (106) respectively for "minimum left" and "minimum right".

When moved together, the levers (103), (105) send the boat forward or stop it.

Wlen moved together, the levers (104), (106), slow the boat down, stop it, put it into reverse.

The unit (24) in turn comprises the levers (107), (108), (109), (110) for working the valves in nozzles (60), (63). The units (23), (24) act on various hydraulic cylinders through the drive unit (18) already referred to.

On the bonnet (43) of the bow, there is a grating (121) through which air is drawn in by the propeller. At the top of the boat can be seen the seats (122), the windscreen (123) and the protective rail (124).

Figure 8:
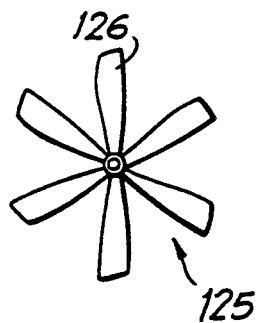
FIG. 8 shows a front view of the propeller.

As shown in FIG. 8, the propeller (125) has preferably six blades like (126).

Operation

By starting up the propeller, the air it sucks in through the grating on the bonnet of the bow, passes through the duct mouths and into the pair of longitudinal channels pushing the water out of them and at the same time causing the boat to rise on the water and move forward.

Due to the effect of the boat's movement the central channel also fills up with air from the lower part of the bow where it enters, contributing to sustain the hull on what is practically a cushion of air.

Figure 7:
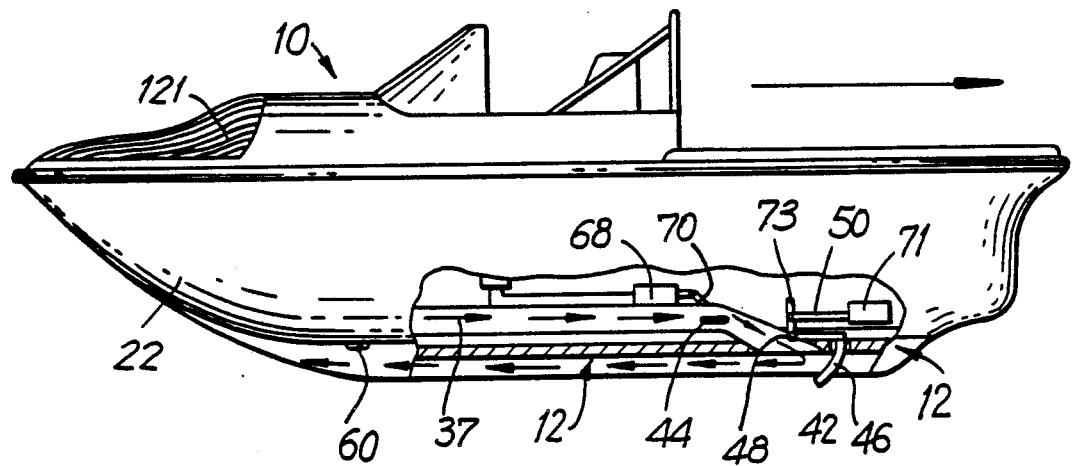
FIG. 7 shows a partially cross-sectional top view of the boat shown in FIG. 1 with directional conveyors pulled out, for reversing the boat.

For braking or reverse movement, it is sufficient to extract the arched directional deflectors (FIG. 7) to an adequate extent, in order to reverse the direction of the air jets inside the pair of channels pushing the air towards the bow.

Similarly, by completely or partially preventing air from issuing from one of the two ducts, the boat can be directed to the right or left as desired.

Movements to position the boat in limited spaces, as in ports, are easily made by keeping the duct valves closed and operating the valves in the lateral nozzles.

For example, by simultaneously opening the front left and back right nozzles the boat will turn round clockwise.

Advantages

These are evident.

Even using a land-type engine, thrust can be applied to the boat by a couple of parallel forces generated in one direction or the other under the hull. The air cushion created in the lateral channels and in the central channel permits the hull to move over the water with minimum friction and therefore with maximum efficiency.

By graduating the value of the couple and the direction of forces, movement can be made forward, backwards or in any direction.

As application of the invention has been described as an example only not limited to this, it is understood that any equivalent application of the inventive concepts described and any product executed and/or in operation in accordance with the characteristics of the invention will be covered by its field of protection.

I claim:

1. A boat propulsion and braking system comprising a central channel extending underneath a substantially flat bottom hull along the entire length of the hull bottom and having an open bottom and a first width; two substantially identical rectilinear parallel channels extending beneath the boat hull on opposite sides of said central channel and having open bottoms and a second width smaller than the first width of said central channel; an inclined outlet located at the summits of each of said two rectilinear parallel channels, forward and backward propulsion and braking of the boat being effected by thrust from jets of compressed air generated inside the hull and emitted through said two inclined outlets with the boat being supported on three air cushions created by respective vertical components of air acting in said rectilinear parallel channels and flow of air into said central channel between the hull and the water surface due to movement of the hull; two on-off valves for controlling air jet flow through said two inclined outlets respectively; and two directional deflectors for changing directions of the air jets flowing from said two inclined outlets, respectively.

2. A boat propulsion and braking system as set forth in claim 1, further comprising two ducts located inside the hull and connected to said two inclined outlets; and a propeller located essentially in a bow of the boat for drawing the air into said ducts.

3. A boat propulsion and braking system as set forth in claim 2, further comprising a land-type internal combustion engine for driving said propeller.

4. A boat propulsion and braking system as set forth in claim 3, further comprising two nozzles arranged substantially symmetrically with respect to a transverse axis of the boat; and two additional on-off valves for controlling said nozzles, respectively, and connected to said two air ducts, respectively.

5. A boat propulsion and braking system as set forth in claim 4, further comprising a plurality of hydraulic cylinders for operating said two on-off valves for controlling said two inclined outlets, said two additional on-off valves, and said two directional deflectors, respectively; a hydraulic drive unit driven by said internal combustion engine connected to said hydraulic cylinders; and control means located on a dashboard of the boat for controlling operation of said boat propulsion and braking system.

6. A boat propulsion and braking system as set forth in claim 5, wherein said control means includes two intermediate levers for effecting "normal forward movement," two front levers for effecting "left forward" and "right forward" movements, respectively, and two back levers for effecting "minimum left" and "minimum right" movements, respectively, the two front levers, when operating together, making possible one of forward movement and stopping, and the two back levers, when operating together, making possible one of reverse and stopping movements, said intermediate, front and back levers controlling operation of all on-off valves and said directional deflectors.

7. A boat propulsion and braking system as set forth in claim 1, wherein said central channel has a cross-section formed as a wide arc, and said two rectilinear parallel channels have each a cross-section formed as a smaller arc adjoining said wide arc.

8. A boat propulsion and braking system as set forth in claim 7, wherein the boat hull has oppositely extending substantially vertical sides, and a bottom defined by said two rectilinear parallel channels and said central channel, the oppositely extending substantially vertical sides of the hull having each a lower portion comprising a convex surface extending to an outer side of a respective rectilinear channel and arranged above the bottom of the respective rectilinear channel to provide for stability of the boat, said convex surfaces being practically clear of water during rapid displacement of the boat.

9. A boat propulsion and braking system as set forth in claim 8, wherein said convex surfaces and the outer sides of said two rectilinear channels form, respectively, two longitudinal grooves defining respective junction points of said convex surfaces with the respective outer sides of said rectilinear parallel channels, said two nozzles being located in said two longitudinal grooves, respectively.

10. A boat propulsion and braking system as set forth in claim 1, wherein said directional deflectors comprise extending substantially vertically arched members spaced from respective outlets and having concave surfaces facing respective inclined outlets and articulation means arranged substantially on respective transverse axes of said outlets and connected with said arched members for changing positions thereof to change directions of air jet flow.

* * * * *